United States Patent
Honjo et al.

(10) Patent No.: US 12,145,424 B2
(45) Date of Patent: Nov. 19, 2024

(54) VEHICLE TEMPERATURE CONTROL SYSTEM

(71) Applicant: HONDA MOTOR CO., LTD., Tokyo (JP)

(72) Inventors: Takuya Honjo, Tokyo (JP); Masashi Bando, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 298 days.

(21) Appl. No.: 17/898,977

(22) Filed: Aug. 30, 2022

(65) Prior Publication Data

US 2023/0092968 A1    Mar. 23, 2023

(30) Foreign Application Priority Data

Sep. 21, 2021   (JP) ................. 2021-153640

(51) Int. Cl.
*B60H 1/00*     (2006.01)
*B60H 1/32*     (2006.01)

(52) U.S. Cl.
CPC ....... *B60H 1/00885* (2013.01); *B60H 1/3205* (2013.01)

(58) Field of Classification Search
CPC .............. B60H 1/00885; B60H 1/3205
See application file for complete search history.

(56) References Cited

U.S. PATENT DOCUMENTS

| | | | |
|---|---|---|---|
| 6,201,365 B1 | 3/2001 | Hara et al. | |
| 6,323,613 B1* | 11/2001 | Hara | H02K 16/00 903/952 |
| 6,568,494 B2* | 5/2003 | Takahashi | B60K 6/22 903/952 |
| 2003/0127528 A1* | 7/2003 | Sabhapathy | B60L 3/0023 237/12.3 B |
| 2004/0045749 A1* | 3/2004 | Jaura | F16H 57/0412 903/952 |
| 2019/0070951 A1* | 3/2019 | Lucke | H01M 10/625 |
| 2023/0092968 A1* | 3/2023 | Honjo | B60K 11/02 62/160 |

FOREIGN PATENT DOCUMENTS

| | | |
|---|---|---|
| JP | 2001-238406 A | 8/2001 |
| JP | 2019-103334 A | 6/2019 |

* cited by examiner

*Primary Examiner* — Henry T Crenshaw
(74) *Attorney, Agent, or Firm* — Paratus Law Group, PLLC

(57) ABSTRACT

A vehicle temperature control system includes: a first temperature control circuit; a second temperature control circuit; a heat exchanger in which heat exchange between a first temperature control medium and a second temperature control medium is performed; and a control device. The control device is capable of controlling a carrier frequency and a flow rate control valve of the second temperature control circuit based on the temperature of the first temperature control medium detected. In a case where the temperature of the first temperature control medium is lower than a predetermined value, the control device is configured to set the carrier frequency to be lower and controls the flow rate control valve such that the flow rate to a second branch flow path is smaller, as compared with a case where the temperature of the first temperature control medium is equal to or higher than the predetermined value.

3 Claims, 3 Drawing Sheets

VEHICLE TEMPERATURE CONTROL SYSTEM

CROSS-REFERENCE TO RELATED APPLICATIONS

This application is based on and claims priority under 35 USC 119 from Japanese Patent Application No. 2021-153640 filed on Sep. 21, 2021, the contents of which are incorporated herein by reference.

TECHNICAL FIELD

The present disclosure relates to a vehicle temperature control system.

BACKGROUND ART

In recent years, as a specific measure against global climate change, efforts for implementing a low-carbon society or a decarbonized society have become active. Also in vehicles, a reduction in a $CO_2$ emission has been strongly required, and electrification of a drive source has been progressing rapidly. Specifically, development of a vehicle including an electric motor (hereinafter, also referred to as a "rotary electric machine") as a drive source and a battery as a secondary battery capable of supplying electric power to the electric motor, such as an electric automobile or a hybrid electric automobile, has been advanced (hereinafter, the vehicle is also referred to as an "electric vehicle"). In addition, such an electric vehicle also includes an electric-power conversion unit that performs conversion of electric power, a gearbox that constitutes a transmission device, and the like. Further, such an electric vehicle is equipped with a vehicle temperature control system that performs temperature control of the rotary electric machine, the electric-power conversion unit, and the like.

For example, JP-A-2001-238406 (hereinafter, referred to as Patent Literature 1) discloses a vehicle temperature control system including a circulation path L through which oil circulates to cool an electric motor M, a circulation path F through which cooling water circulates to cool an inverter U, and a heat exchange part (oil cooler C) in which heat exchange between the cooling water flowing through the circulation path F and the oil flowing through the circulation path L is performed.

Further, JP-A-2019-103334 (hereinafter, referred to as Patent Literature 2) discloses a technique of performing control in which, when a temperature of oil is lower than a predetermined value, a discharge amount of an electric water pump is reduced so that the temperature of the oil increases, and when the temperature of the oil is equal to or higher than the predetermined value, the discharge amount of the electric water pump is changed in proportion to a vehicle speed so that the temperature of the oil decreases.

When a temperature of oil that lubricates a rotary electric machine and a gearbox is low, a friction loss of the rotary electric machine and the gearbox increases. Therefore, when the temperature of the oil that lubricates the rotary electric machine and the gearbox is relatively low, it is desirable to raise the temperature of the oil as early as possible, and there is room for improvement in this aspect in the related art.

The present disclosure provides a vehicle temperature control system capable of suppressing an increase in friction loss of a rotary electric machine and a gearbox.

SUMMARY

The present disclosure provides a vehicle temperature control system, including:

a first temperature control circuit that is provided with a first pump and that is configured to perform temperature control of a rotary electric machine and a gearbox provided in a vehicle;

a second temperature control circuit that is provided with a second pump and that is configured to perform temperature control of an electric-power conversion unit provided in the vehicle;

a heat exchanger in which heat exchange between a first temperature control medium circulating through the first temperature control circuit and a second temperature control medium circulating through the second temperature control circuit is performed; and a control device, in which the first temperature control circuit includes a first temperature sensor configured to detect a temperature of the first temperature control medium, in which the second temperature control circuit includes
a radiator with which heat exchange between the second temperature control medium and outside air is performed,
a first branch flow path of the second temperature control medium that bypasses the heat exchanger,
a second branch flow path of the second temperature control medium that passes through heat exchanger, and
a flow rate control valve with which a flow rate of the second temperature control medium to the second branch flow path is controlled, in which the electric-power conversion unit includes an inverter configured to supply electric power to the rotary electric machine, and is capable of changing a carrier frequency of the inverter according to control of the control device, and in which the control device is capable of controlling the carrier frequency and the flow rate control valve based on the temperature of the first temperature control medium detected by the first temperature sensor, and in which in a case where the temperature of the first temperature control medium is lower than a predetermined value, the control device sets the carrier frequency to be lower and controls the flow rate control valve such that the flow rate to the second branch flow path is smaller, as compared with a case where the temperature of the first temperature control medium is equal to or higher than the predetermined value.

According to the present disclosure, it is possible to suppress an increase in friction loss of a rotary electric machine and a gearbox.

BRIEF DESCRIPTION OF DRAWINGS

An exemplary embodiment of the present disclosure will be described in detail based on the following figures, wherein.

DESCRIPTION OF EMBODIMENTS

Hereinafter, an embodiment of a vehicle equipped with a vehicle temperature control system according to the present disclosure will be described with reference to the accompanying drawings. It should be noted that the drawings are to be viewed according to orientation of the reference signs.

[Vehicle]

Figure 1:
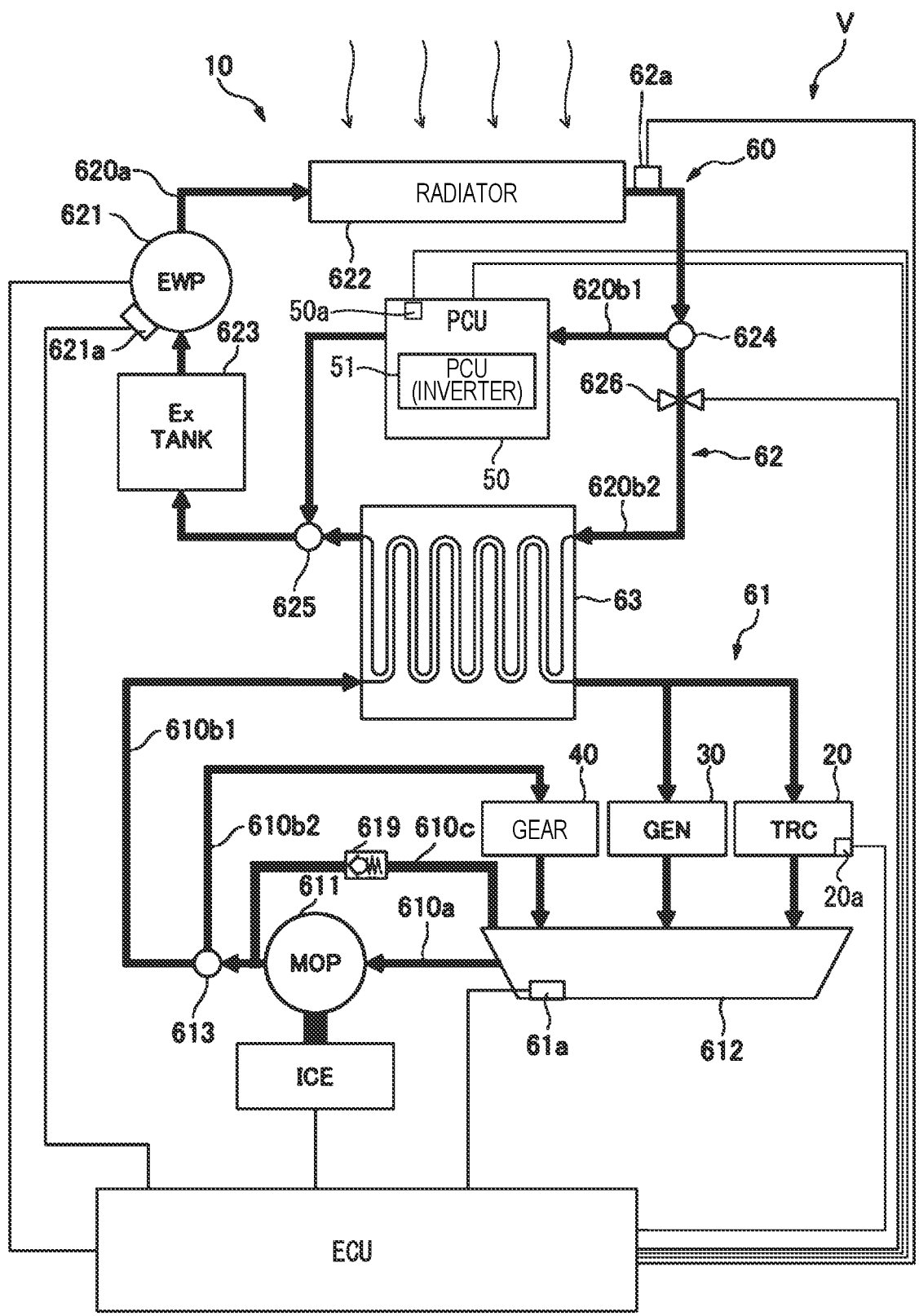
FIG. 1 is a block diagram illustrating a vehicle equipped with a vehicle temperature control system according to an embodiment.

First, a vehicle according to the present embodiment will be described with reference to FIG. 1. As illustrated in FIG. 1, a vehicle V of the present embodiment includes an internal combustion engine ICE, a control device ECU, a vehicle temperature control system 10, an electric motor 20, a generator 30, a transmission device 40, an electric-power conversion unit 50, and a temperature control circuit 60.

The electric motor 20 is a rotary electric machine that outputs power for driving the vehicle V using electric power stored in an electrical storage device (not illustrated) mounted on the vehicle V or electric power generated by the generator 30. During braking of the vehicle V, the electric motor 20 may generate electric power using kinetic energy of drive wheels of the vehicle V to charge the electrical storage device described above. The electric motor 20 is provided with a third temperature sensor 20a that detects a temperature of the electric motor 20. The third temperature sensor 20a outputs a detection value of the temperature of the electric motor 20 to the control device ECU.

The generator 30 is a rotary electric machine that generates electric power using power of the internal combustion engine ICE, and charges the electrical storage device described above, or supplies the electric power to the electric motor 20.

The transmission device 40 is provided between the electric motor 20 and the drive wheels of the vehicle V, and is a power transmission device configured to be able to transmit the power between the electric motor 20 and the drive wheels. For example, the transmission device 40 is a gear-type power transmission device that moderates the power output from the electric motor 20 and transmits the moderated power to the drive wheels.

The electric-power conversion unit 50 includes a power drive unit (PDU) 51 that converts electric power output from the electrical storage device described above from direct current to alternating current and controls input and output electric power of the electric motor 20 and the generator 30, and a voltage control unit (VCU) (not illustrated) that boosts a voltage of electric power output from the electrical storage device described above as necessary. Specifically, the PDU 51 is an inverter capable of converting a direct current output from the electrical storage device into an alternating current and supplying the alternating current to the electric motor 20. Pulse width modulation (PWM) control is used for the control of the PDU 51 by the control device ECU.

The electric-power conversion unit 50 is configured to be capable of changing a carrier frequency of the PDU 51 (that is, the inverter) under the control of the control device ECU. When the electric motor 20 generates electric power during braking of the vehicle V, the VCU may step down a voltage of the electric power generated by the electric motor 20. The electric-power conversion unit 50 is provided with a fourth temperature sensor 50a that detects a temperature of the electric-power conversion unit 50. The fourth temperature sensor 50a outputs a detection value of the temperature of the electric-power conversion unit 50 to the control device ECU.

The temperature control circuit 60 includes a first temperature control circuit 61 through which a non-conductive first temperature control medium TCM1 circulates to control temperatures of the electric motor 20, the generator 30, and the transmission device 40, a second temperature control circuit 62 through which a conductive second temperature control medium TCM2 circulates to control the temperature of the electric-power conversion unit 50, and a heat exchanger 63 in which heat exchange between the first temperature control medium TCM1 and the second temperature control medium TCM2 is performed. The non-conductive first temperature control medium TCM1 is, for example, oil that is called automatic transmission fluid (ATF) and can lubricate the electric motor 20, the generator 30, and the transmission device 40 and control the temperatures thereof. The conductive second temperature control medium TCM2 is, for example, cooling water that is called long life coolant (LLC).

The first temperature control circuit 61 is provided with a first pump (MOP) 611 and a storage part 612. The first pump 611 is a mechanical pump driven by the power of the internal combustion engine ICE and a rotational force of an axle (not illustrated) of the vehicle V. The storage part 612 stores the first temperature control medium TCM1 circulating through the first temperature control circuit 61. The storage part 612 is, for example, an oil pan provided at a bottom of a housing (not illustrated) in which the electric motor 20, the generator 30, and the transmission device 40 are housed.

The first temperature control circuit 61 includes a pressure feeding flow path 610a in which the first pump 611 is provided, a first branch flow path 610b1 in which the electric motor 20 and the generator 30 are provided, a second branch flow path 610b2 in which the transmission device 40 is provided, and a branching portion 613 at which the first temperature control circuit 61 branches into the first branch flow path 610b1 and the second branch flow path 610b2.

An upstream end portion of the pressure feeding flow path 610a is connected to the storage part 612, and a downstream end portion of the pressure feeding flow path 610a is connected to the branching portion 613 through the first pump 611. An upstream end portion of the first branch flow path 610b1 is connected to the branching portion 613, and a downstream end portion of the first branch flow path 610b1 is connected to the storage part 612 through the electric motor 20 and the generator 30. An upstream end portion of the second branch flow path 610b2 is connected to the branching portion 613, and a downstream end portion of the second branch flow path 610b2 is connected to the storage part 612 through the transmission device 40.

In the first temperature control circuit 61, the heat exchanger 63 is disposed upstream of the electric motor 20 and the generator 30 in the first branch flow path 610b1. Therefore, in the first temperature control circuit 61, a first flow path and a second flow path of the first temperature control medium TCM1 are formed in parallel. Specifically, in the first flow path, the first temperature control medium TCM1 pressure-fed from the first pump 611 flows through the first branch flow path 610b1 from the branching portion 613, is cooled by the heat exchange with the second temperature control medium TCM2 in the heat exchanger 63, is supplied to the electric motor 20 and the generator 30 to lubricate the electric motor 20 and the generator 30 and control the temperatures thereof, and then is stored in the storage part 612. In the second flow path, the first temperature control medium TCM1 pressure-fed from the first pump 611 flows through the second branch flow path 610b2 from the branching portion 613, is supplied to the transmission device 40 to lubricate the transmission device 40 and control the temperature thereof, and then is stored in the storage part 612. The first temperature control medium TCM1 stored in the storage part 612 flows through the pressure feeding flow path 610a and is supplied to the first pump 611, thereby the first temperature control medium TCM1 circulating through the first temperature control circuit 61.

In the present embodiment, the first branch flow path 610b1 and the second branch flow path 610b2 are formed such that a flow rate of the first temperature control medium TCM1 flowing through the first branch flow path 610b1 is larger than a flow rate of the first temperature control medium TCM1 flowing through the second branch flow path 610b2.

The first temperature control circuit 61 is provided with a first temperature sensor 61a that detects a temperature of the first temperature control medium TCM1 circulating through the first temperature control circuit 61. In the present embodiment, the first temperature sensor 61a is provided in the storage part 612, which is an oil pan, and detects the temperature of the first temperature control medium TCM1 stored in the storage part 612. The first temperature sensor 61a outputs a detection value of the temperature of the first temperature control medium TCM1 stored in the storage part 612 to the control device ECU.

The first temperature control circuit 61 further includes a pressure control circuit 610c provided with a pressure control valve 619. An upstream end portion of the pressure control circuit 610c is connected to the storage part 612, and a downstream end portion of the pressure control circuit 610c is connected to the pressure feeding flow path 610a downstream of the first pump 611. The pressure control valve 619 may be a check valve or an electromagnetic valve such as a solenoid valve. When a liquid pressure of the first temperature control medium TCM1 pressure-fed from the first pump 611 becomes equal to or higher than a predetermined pressure, the pressure control valve 619 is opened, and a part of the first temperature control medium TCM1 pressure-fed from the first pump 611 is returned to the storage part 612. Accordingly, the liquid pressure of the first temperature control medium TCM1 flowing through the first branch flow path 610b1 and the second branch flow path 610b2 is maintained at the predetermined pressure or lower.

The second temperature control circuit 62 is provided with a second pump (EWP) 621, a radiator 622, and a storage tank 623. The second pump 621 is, for example, an electric pump that is driven by the electric power stored in the electrical storage device. A rotational speed sensor 621a that detects a rotational speed of the second pump 621 is attached to the second pump 621. The rotational speed sensor 621a outputs a detection value of the rotational speed of the second pump 621 to the control device ECU.

The radiator 622 is disposed at a front portion of the vehicle V, and is a heat dissipation device that cools the second temperature control medium TCM2 by traveling wind formed during traveling of the vehicle V. The storage tank 623 is a tank in which the second temperature control medium TCM2 circulating through the second temperature control circuit 62 is temporarily stored. Even when cavitation occurs in the second temperature control medium TCM2 circulating through the second temperature control circuit 62, the cavitation occurring in the second temperature control medium TCM2 disappears because the second temperature control medium TCM2 circulating through the second temperature control circuit 62 is temporarily stored in the storage tank 623.

The second temperature control circuit 62 includes a branching portion 624 and a merging portion 625. In the second temperature control circuit 62, the storage tank 623, the second pump 621, and the radiator 622 are provided in this order from an upstream side. The second temperature control circuit 62 further includes a pressure feeding flow path 620a. An upstream end portion of the pressure feeding flow path 620a is connected to the merging portion 625, and a downstream end portion of the pressure feeding flow path 620a is connected to the branching portion 624 through the storage tank 623, the second pump 621, and the radiator 622. The second temperature control medium TCM2 stored in the storage tank 623 is pressure-fed by the second pump 621 through the pressure feeding flow path 620a, and is cooled by the radiator 622.

The second temperature control circuit 62 further includes a first branch flow path 620b1 in which the electric-power conversion unit 50 is provided, and a second branch flow path 620b2 in which the heat exchanger 63 is provided. An upstream end portion of the first branch flow path 620b1 is connected to the branching portion 624, and a downstream end portion of the first branch flow path 620b1 is connected to the merging portion 625 through the electric-power conversion unit 50. An upstream end portion of the second branch flow path 620b2 is connected to the branching portion 624, and a downstream end portion of the second branch flow path 620b2 is connected to the merging portion 625 through the heat exchanger 63.

In the present embodiment, a valve device 626 serving as a flow rate control valve is provided in a portion of the second branch flow path 620b2 upstream of the heat exchanger 63. The valve device 626 may be an on-off valve that switches the second branch flow path 620b2 between a fully open state and a fully closed state, or may be a variable flow rate valve capable of controlling a flow rate of the second temperature control medium TCM2 flowing through the second branch flow path 620b2. The valve device 626 is controlled by the control device ECU.

The second temperature control medium TCM2 pressure-fed by the second pump 621 and cooled by the radiator 622 in the pressure feeding flow path 620a branches its flow into the first branch flow path 620b1 and the second branch flow path 620b2 at the branching portion 624. The second temperature control medium TCM2 flowing through the first branch flow path 620b1 cools the electric-power conversion unit 50, and merges with the second branch flow path 620b2 and the pressure feeding flow path 620a at the merging portion 625. The second temperature control medium TCM2 flowing through the second branch flow path 620b2 cools the first temperature control medium TCM1 by exchanging heat with the first temperature control medium TCM1 in the heat exchanger 63, and merges with the first branch flow path 620b1 and the pressure feeding flow path 620a at the merging portion 625. The second temperature control medium TCM2 flowing through the first branch flow path 620b1 and the second temperature control medium TCM2 flowing through the second branch flow path 620b2 are merged at the merging portion 625, and the merged second temperature control medium TCM2 flows through the pressure feeding flow path 620a and is temporarily stored in the storage tank 623. Then, the second temperature control medium TCM2 stored in the storage tank 623 is supplied again to the second pump 621 through the pressure feeding flow path 620a, thereby the second temperature control medium TCM2 circulating through the second temperature control circuit 62.

In the present embodiment, the first branch flow path 620b1 and the second branch flow path 620b2 are formed such that a flow rate of the second temperature control medium TCM2 flowing through the first branch flow path 620b1 is larger than a flow rate of the second temperature control medium TCM2 flowing through the second branch flow path 620b2.

The second temperature control circuit 62 is provided with a second temperature sensor 62a that detects a temperature of the second temperature control medium TCM2 circulating through the second temperature control circuit 62. In the present embodiment, the second temperature sensor 62a is provided in the pressure feeding flow path 620a between the radiator 622 and the branching portion 624, and detects the temperature of the second temperature control medium TCM2 discharged from the radiator 622. The second temperature sensor 62a outputs a detection value of the temperature of the second temperature control medium TCM2 discharged from the radiator 622 to the control device ECU.

In the first temperature control circuit 61, when it is assumed that the temperature of the first temperature control medium TCM1 stored in the storage part 612 after cooling the electric motor 20, the generator 30, and the transmission device 40 is about 100 [° C.], the first temperature control medium TCM1 of about 100 [° C.] is supplied to the heat exchanger 63.

On the other hand, in the second temperature control circuit 62, when it is assumed that the temperature of the second temperature control medium TCM2 cooled by the radiator 622 is about 40 [° C.], since the second temperature control medium TCM2 to be supplied to the heat exchanger 63 does not pass through the electric-power conversion unit 50 that is a temperature controlled device, the second temperature control medium TCM2 of about 40 [° C.] is supplied to the heat exchanger 63.

In this case, in the heat exchanger 63, heat exchange between the first temperature control medium TCM1 of about 100 [° C.] and the second temperature control medium TCM2 of about 40 [° C.], which are supplied to the heat exchanger 63, is performed. Then, the first temperature control medium TCM1 of about 80 [° C.] is discharged from the heat exchanger 63 to a downstream side of the first branch flow path 610b1 of the first temperature control circuit 61, and the second temperature control medium TCM2 of about 70 [° C.] is discharged from the heat exchanger 63 to a downstream side of the second branch flow path 620b2 of the second temperature control circuit 62.

In this way, since the first temperature control medium TCM1 is cooled in the heat exchanger 63, the temperature control circuit 60 can cool the first temperature control medium TCM1 without providing a radiator for cooling the first temperature control medium TCM1. Therefore, since the temperature control circuit 60 can cool the first temperature control medium TCM1 flowing through the first temperature control circuit 61 and the second temperature control medium TCM2 flowing through the second temperature control circuit 62 by one radiator 622, the temperature control circuit 60 can be miniaturized.

The control device ECU is implemented by, for example, an electronic control unit (ECU) including a processor that performs various types of calculation, a storage device that stores various types of information, an input and output device that controls input and output of data between the inside and the outside of the control device ECU, and the like, and performs overall control of the entire vehicle V. The control device ECU may be implemented by a single ECU or may be implemented by a plurality of ECUs. The control device ECU controls, for example, the internal combustion engine ICE, the electric-power conversion unit 50, the second pump 621, the valve device 626, and the like.

In general, viscosity of the first temperature control medium TCM1 increases as the temperature thereof decreases. When the viscosity of the first temperature control medium TCM1 increases, a friction loss generated in the electric motor 20 and the transmission device 40 increases, and output efficiency of the electric motor 20 and the transmission device 40 decreases. Therefore, in a case where the temperature of the first temperature control medium TCM1 is low (for example, the temperature of the first temperature control medium TCM1 is lower than a predetermined value), for example, immediately after start of the electric motor 20 and the generator 30, it is preferable that the first temperature control medium TCM1 is not cooled (that is, it is preferable to raise the temperature of the first temperature control medium TCM1).

Therefore, the control device ECU controls the valve device 626 based on the temperature of the first temperature control medium TCM1 detected by the first temperature sensor 61a. The control device ECU can control the heat exchange between the first temperature control medium TCM1 and the second temperature control medium TCM2 in the heat exchanger 63 by using the valve device 626 to adjust the flow rate of the second temperature control medium TCM2 to the second branch flow path 620b2 in which the heat exchanger 63 is provided.

Specifically, in a case where the temperature of the first temperature control medium TCM1 is lower than a predetermined value (for example, 50 [° C.]), the control device ECU controls the valve device 626 such that the flow rate of the second temperature control medium TCM2 to the second branch flow path 620b2 is smaller than the flow rate in a case where the temperature of the first temperature control medium TCM1 is equal to or higher than the predetermined value. In other words, in a case where the temperature of the first temperature control medium TCM1 is lower than the predetermined value, the control device ECU controls the valve device 626 such that the flow rate of the second temperature control medium TCM2 to the first branch flow path 620b1 is larger than the flow rate in a case where the temperature of the first temperature control medium TCM1 is equal to or higher than the predetermined value. Here, the predetermined value is set in advance by, for example, a manufacturer of the control device ECU.

As described, in a case where the temperature of the first temperature control medium TCM1 is lower than the predetermined value, the flow rate of the second temperature control medium TCM2 to the second branch flow path 620b2 in which the heat exchanger 63 is provided is reduced, so that heat exchange between the first temperature control medium TCM1 and the second temperature control medium TCM2 via the heat exchanger 63 can be suppressed. Accordingly, it is possible to avoid the heat of the first temperature control medium TCM1 from being transferred to the second temperature control medium TCM2, and to suppress a decrease in the temperature of the first temperature control medium TCM1. Therefore, it is possible to suppress an increase in friction loss of the electric motor 20 and the transmission device 40 caused due to a temperature of the first temperature control medium TCM1 being low.

Further, the control device ECU controls the carrier frequency of the PDU 51 (that is, the inverter) based on the temperature of the first temperature control medium TCM1 detected by the first temperature sensor 61a. Specifically, in a case where the temperature of the first temperature control medium TCM1 is lower than a predetermined value, the control device ECU sets the carrier frequency of the PDU 51 to be lower than the carrier frequency in a case where the temperature of the first temperature control medium TCM1 is equal to or higher than the predetermined value.

As described, in a case where the temperature of the first temperature control medium TCM1 is lower than the predetermined value, the carrier frequency of the PDU 51 is lowered, so that a loss of the electric motor 20 can be increased and the amount of heat generated by the electric motor 20 due to the loss can be increased. Therefore, the temperature of the first temperature control medium TCM1 can be quickly raised using the heat of the electric motor 20, and an increase in friction loss of the electric motor 20 and the transmission device 40 caused due to a temperature of the first temperature control medium TCM1 being low can be suppressed.

Further, the control device ECU may control the second pump 621 based on the temperature of the first temperature control medium TCM1 detected by the first temperature sensor 61a. Specifically, in a case where the temperature of the first temperature control medium TCM1 is lower than a predetermined value, the control device ECU may reduce a flow rate of the second pump 621 as compared with a case where the temperature of the first temperature control medium TCM1 is equal to or higher than the predetermined value.

That is, in a case where the carrier frequency of the PDU 51 is low, the amount of heat generated by the PDU 51 is also small, and thus the temperature of the second temperature control medium TCM2 hardly rises even if the flow rate of the second pump 621 is reduced. Therefore, in a case where the temperature of the first temperature control medium TCM1 is lower than the predetermined value, the flow rate of the second pump 621 is reduced, so that it is possible to reduce energy (for example, electric power) required for driving the second pump 621 while suppressing an increase in temperature of the second temperature control medium TCM2.

Control Example of Valve Device, Carrier Frequency, and Second Pump by Control Device Next, a specific control example of the valve device 626, the carrier frequency of the PDU 51, and the second pump 621 by the control device ECU will be described with reference to FIGS. 2 and 3.

First, an example of the carrier frequency of the PDU 51 that can be set by the control device ECU will be described. In the present embodiment, the control device ECU is configured to be able to set fa [Hz], fb [Hz], and fc [Hz] illustrated in FIG. 2 as the carrier frequency of the PDU 51. These carrier frequencies are set in an ascending order of fa [Hz]<fb [Hz]<fc [Hz].

As described above, as the carrier frequency of the PDU 51 decreases, the loss of the electric motor 20 increases, and thus efficiency of the electric motor 20 decreases. In other words, as the carrier frequency of the PDU 51 increases, the efficiency of the electric motor 20 increases. For example, if the efficiency of the electric motor 20 at the time when the carrier frequency is fa [Hz] is denoted by EMa, the efficiency of the electric motor 20 at the time when the carrier frequency is fb [Hz] is denoted by EMb, and the efficiency of the electric motor 20 at the time when the carrier frequency is fc [Hz] is denoted by EMc, EMa<EMb<EMc.

On the other hand, efficiency of the PDU 51 increases as the carrier frequency of the PDU 51 decreases. For example, if the efficiency of the PDU 51 at the time when the carrier frequency is fa [Hz] is denoted by EPa, the efficiency of the PDU 51 at the time when the carrier frequency is fb [Hz] is denoted by EPb, and the efficiency of the PDU 51 at the time when the carrier frequency is fc [Hz] is denoted by EPc, EPa>EPb>EPc.

Figure 2:
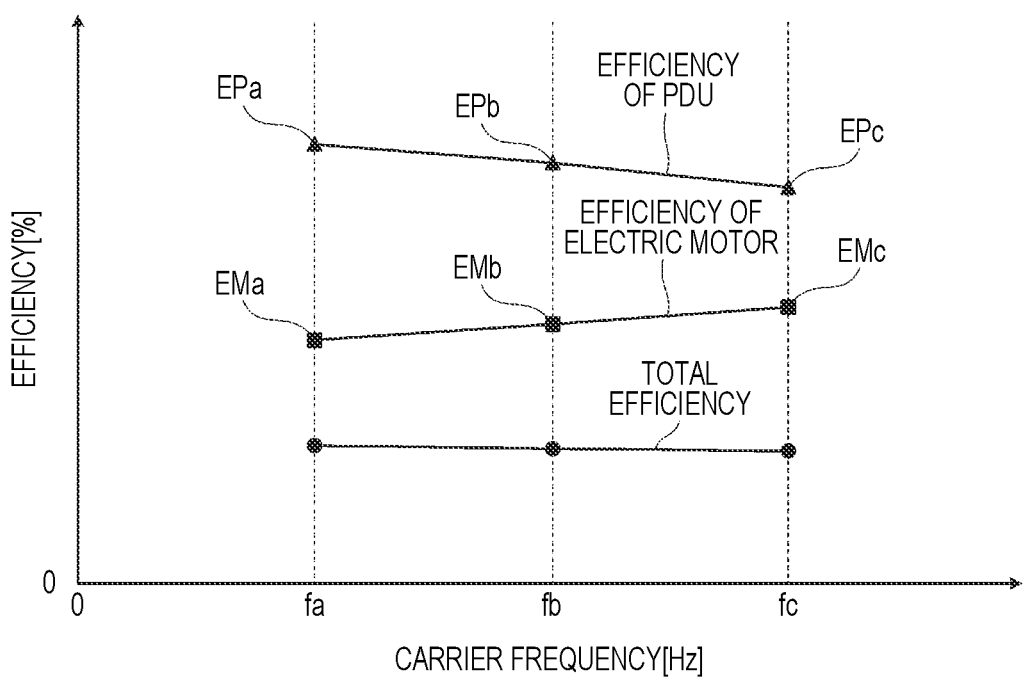
FIG. 2 is a graph illustrating an example of a carrier frequency that can be set by a control device according to the present embodiment.

By utilizing such a relationship of the efficiency of the electric motor 20 and the PDU 51 with respect to the carrier frequency of the PDU 51, in the present embodiment, even when the carrier frequency of the PDU 51 is set to any one of fa [Hz], fb [Hz], and fc [Hz], a total efficiency of both the electric motor 20 and the PDU 51 is substantially constant as illustrated in FIG. 2. In other words, fa [Hz], fb [Hz], and fc [Hz] at which the total efficiency of both the electric motor 20 and the PDU 51 is substantially constant are stored in the control device ECU in advance as carrier frequencies that can be set by the control device ECU. In addition, information indicating a flow rate of the second pump 621 to be set when a carrier frequency among the stored carrier frequencies is set is also stored in advance in the control device ECU in association with the carrier frequency.

Next, an example of processing executed by the control device ECU will be described. For example, when ignition power supply of the vehicle V is turned on, the control device ECU sets fc [Hz] as an initial value of the carrier frequency and starts driving the PDU 51 (that is, the electric-power conversion unit 50), and starts driving the second pump 621 such that the flow rate of the second pump 621 becomes a flow rate corresponding to fc [Hz]. Then, the control device ECU executes the processing illustrated in FIG. 3.

Figure 3:
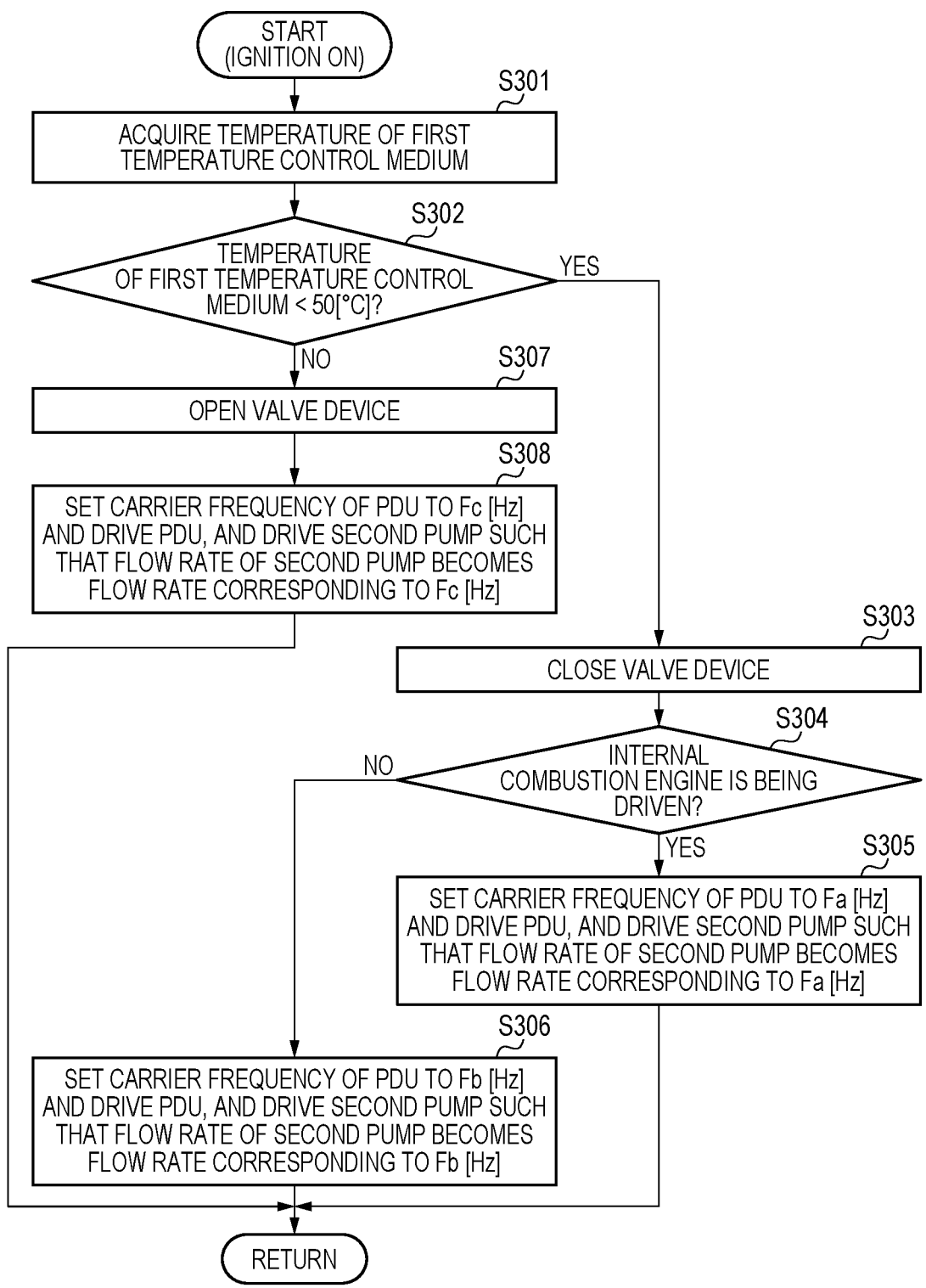
FIG. 3 is a flowchart illustrating an example of processing executed by the control device according to the present embodiment.

In FIG. 3, the control device ECU first acquires a temperature of the first temperature control medium TCM1 detected by the first temperature sensor 61a (step S301), and determines whether the temperature of the first temperature control medium TCM1 is lower than 50 [° C.] (step S302). When it is determined that the temperature of the first temperature control medium TCM1 is lower than 50 [° C.] (step S302: Yes), the control device ECU closes the valve device 626 (step S303), and proceeds to step S304. By closing the valve device 626, the flow rate of the second temperature control medium TCM2 to the second branch flow path 620b2 in which the heat exchanger 63 is provided can be reduced, and heat exchange between the first temperature control medium TCM1 and the second temperature control medium TCM2 via the heat exchanger 63 can be suppressed. Therefore, it is possible to avoid the heat of the first temperature control medium TCM1 from being transferred to the second temperature control medium TCM2, and to suppress a decrease in the temperature of the first temperature control medium TCM1.

Next, the control device ECU determines whether the internal combustion engine ICE is being driven (step S304). When it is determined that the internal combustion engine ICE is being driven (step S304: Yes), the control device ECU sets the carrier frequency of the PDU 51 to fa [Hz] (that is, the minimum value among the carrier frequencies that can be set) and drives the PDU 51, and drives the second pump 621 such that the flow rate of the second pump 621 becomes a flow rate corresponding to fa [Hz] (step S305), and returns to step S301. Here, the flow rate of the second pump 621 corresponding to fa [Hz] is smaller than flow rates of the second pumps 621 corresponding to fb [Hz] and fc [Hz], respectively.

That is, when the temperature of the first temperature control medium TCM1 is lower than 50 [° C.] and the internal combustion engine ICE is being driven, the control device ECU sets the carrier frequency of the PDU 51 as low as possible to operate the PCU 50 with high efficiency and operate the electric motor 20 inefficiently. Accordingly, it is possible to increase the loss of the electric motor 20 (that is, heat generation of the electric motor 20) to raise the temperature of the first temperature control medium TCM1 using heat of the electric motor 20 while suppressing a decrease in total efficiency of both the electric motor 20 and the PDU 51. In addition, when the control device ECU operates the PCU 50 with high efficiency by lowering the carrier frequency of the PDU 51 in this way, that is, when the heat generation of the PCU 50 is small, the control device ECU reduces the flow rate of the second pump 621, so that the energy (for example, electric power) required for driving the second pump 621 can be reduced and an increase in temperature of the second temperature control medium TCM2 can be suppressed.

On the other hand, in step S304, when the control device ECU determines that the internal combustion engine ICE is not being driven (step S304: No), the control device ECU sets the carrier frequency of the PDU 51 to fb [Hz] (that is, an intermediate value among the carrier frequencies that can be set) and drives the PDU 51, and drives the second pump 621 such that the flow rate of the second pump 621 becomes a flow rate corresponding to fb [Hz] (step S306), and returns to step S301. Here, the flow rate of the second pump 621 corresponding to fb [Hz] is larger than the flow rate of the second pump 621 corresponding to fa [Hz] and smaller than the flow rate of the second pump 621 corresponding to fc [Hz].

That is, when the temperature of the first temperature control medium TCM1 is lower than 50 [° C.] and the internal combustion engine ICE is not being driven (for example, during EV traveling of the vehicle V), it is necessary to secure a driving force of the vehicle V only by the electric motor 20, and thus the control device ECU lowers the carrier frequency of the PDU 51, but does not lower the carrier frequency as much to the carrier frequency that is used in the processing of step S305.

In general, when the electric motor 20 is driven by lowering the carrier frequency of the PDU 51, a driving sound of the electric motor 20 increases. For this reason, if the carrier frequency of the PDU 51 is lowered to fa [Hz] when the internal combustion engine ICE is not driven (for example, during EV traveling of the vehicle V), NV (Noise, Vibration) characteristics of the vehicle V are deteriorated due to the driving sound of the electric motor 20, and the marketability of the vehicle V may be impaired. Therefore, in the present embodiment, as described above, in a case where the temperature of the first temperature control medium TCM1 is lower than 50 [° C.] and the internal combustion engine ICE is being driven, the carrier frequency of the PDU 51 is set lower and the flow rate of the second pump 621 is set smaller, as compared with a case where the temperature of the first temperature control medium TCM1 is lower than 50 [° C.] and the internal combustion engine ICE is stopped (that is, not being driven). Accordingly, it is possible to facilitate the temperature rise of the first temperature control medium TCM1 with the heat of the electric motor 20 while suppressing the deterioration of the NV characteristics of the vehicle V due to the driving sound of the electric motor 20.

When it is determined in step S302 that the temperature of the first temperature control medium TCM1 is not lower than 50 [° C.] (step S302: No), the control device ECU opens the valve device 626 (step S307). Then, the control device ECU sets the carrier frequency of the PDU 51 to fc [Hz] (that is, the maximum value among the carrier frequencies that can be set) and drives the PDU 51, and drives the second pump 621 such that the flow rate of the second pump 621 becomes a flow rate corresponding to fc [Hz] (step S308), and returns to step S301.

That is, when the temperature of the first temperature control medium TCM1 is equal to or higher than 50 [° C.], the control device ECU opens the valve device 626 to increase the flow rate of the second temperature control medium TCM2 to the second branch flow path 620$b$2 in which the heat exchanger 63 is provided. Accordingly, heat exchange between the first temperature control medium TCM1 and the second temperature control medium TCM2 via the heat exchanger 63 is promoted, and an increase in temperature of the first temperature control medium TCM1 can be suppressed. Further, the control device ECU increases the carrier frequency of the PDU 51 to operate the electric motor 20 with high efficiency, so that the amount of heat generated by the electric motor 20 can be reduced. Accordingly, it is possible to suppress the increase in temperature of the first temperature control medium TCM1. The amount of heat generated by the PDU 51 increases when the carrier frequency of the PDU 51 is increased. In such a case, the control device ECU increases the flow rate of the second pump 621 so that an increase in temperature of the second temperature control medium TCM2 can be suppressed.

As described above, according to the present embodiment, when the temperature of the first temperature control medium TCM1 is lower than a predetermined value, the carrier frequency of the PDU 51 is lowered, and the valve device 626 is controlled so that the flow rate of the second temperature control medium TCM2 to the second branch flow path 620$b$2 provided with the heat exchanger 63 is reduced. Accordingly, the temperature of the first temperature control medium TCM1 can be quickly raised, and an increase in friction loss of the electric motor 20 and the transmission device 40 caused due to a temperature of the temperature control medium TCM1 being low can be suppressed.

Although one embodiment of the present disclosure has been described above with reference to the accompanying drawings, it is needless to say that the present disclosure is not limited to such an embodiment. It will be apparent to those skilled in the art that various changes and modifications may be conceived within the scope of the claims. It is also understood that the various changes and modifications belong to the technical scope of the present disclosure. The constituent elements in the embodiment described above may be combined freely within a range not departing from the spirit of the invention.

For example, although a configuration in which the vehicle V includes the internal combustion engine ICE is described, the vehicle V may be an electric vehicle that does not include the internal combustion engine ICE.

Although a configuration in which the electric-power conversion unit 50 and the heat exchanger 63 are arranged in parallel has been described, the electric-power conversion unit 50 and the heat exchanger 63 may be arranged in series.

For example, the electric-power conversion unit 50 may be arranged between the radiator 622 and the branching portion 624.

In addition, a grille shutter configured to be able to adjust the amount of outside air blowing against the radiator 622 according to the control of the control device ECU may be provided at a front side of the radiator 622. In this way, the control device ECU can control the cooling of the second temperature control medium TCM2 by the radiator 622 through the opening and closing of the grille shutter.

At least the following matters are described in the present specification. In the parentheses, the corresponding components and the like in the above embodiment are shown as an example, and the present disclosure is not limited thereto.

(1) A vehicle temperature control system (vehicle temperature control system 10), including:
- a first temperature control circuit (first temperature control circuit 61) that is provided with a first pump (first pump 611) and that is configured to perform temperature control of a rotary electric machine (electric motor 20) and a gearbox (transmission device 40) provided in a vehicle (vehicle V);
- a second temperature control circuit (second temperature control circuit 62) that is provided with a second pump (second pump 621) and that is configured to perform temperature control of an electric-power conversion unit (electric-power conversion unit 50) provided in the vehicle;
- a heat exchanger (heat exchanger 63) in which heat exchange between a first temperature control medium circulating through the first temperature control circuit and a second temperature control medium circulating through the second temperature control circuit is performed; and
- a control device (control device ECU),
- in which the first temperature control circuit includes a first temperature sensor (first temperature sensor 61*a*) configured to detect a temperature of the first temperature control medium,
- in which the second temperature control circuit includes
  - a radiator (radiator 622) with which heat exchange between the second temperature control medium and outside air is performed,
  - a first branch flow path (first branch flow path 620*b*1) of the second temperature control medium that bypasses the heat exchanger,
  - a second branch flow path (second branch flow path 620*b*2) of the second temperature control medium that passes through the heat exchanger, and
  - a flow rate control valve (valve device 626) with which a flow rate of the second temperature control medium to the second branch flow path is controlled, and
- in which the electric-power conversion unit includes an inverter (PDU 51) configured to supply electric power to the rotary electric machine, and is capable of changing a carrier frequency of the inverter according to control of the control device, and
- in which the control device is capable of controlling the carrier frequency and the flow rate control valve based on the temperature of the first temperature control medium detected by the first temperature sensor, and
- in which in a case where the temperature of the first temperature control medium is lower than a predetermined value, the control device sets the carrier frequency to be lower and controls the flow rate control valve such that the flow rate to the second branch flow path is smaller, as compared with a case where the temperature of the first temperature control medium is equal to or higher than the predetermined value.

According to (1), when the temperature of the first temperature control medium is lower than the predetermined value, the control device sets the carrier frequency of the inverter, which supplies electric power to the rotary electric machine, to be lower than the carrier frequency when the temperature of the first temperature control medium is equal to or higher than the predetermined value. Accordingly, it is possible to increase the amount of heat generated accompanying a loss of the rotary electric machine in the case where the temperature of the first temperature control medium is lower than the predetermined value. Further, when the temperature of the first temperature control medium is lower than the predetermined value, the control device controls the flow rate control valve such that the flow rate of the second temperature control medium to the second branch flow path passing through the heat exchanger is smaller than the flow rate when the temperature of the first temperature control medium is equal to or higher than the predetermined value. Accordingly, it is possible to suppress the heat exchange between the first temperature control medium and the second temperature control medium in the heat exchanger, that is, the heat of the first temperature control medium being released to the second temperature control medium. Therefore, it is possible to quickly raise the temperature of the first temperature control medium using the heat of the rotary electric machine, and it is possible to suppress an increase in friction loss of the rotary electric machine and the gearbox caused due to a temperature of the first temperature control medium being low.

(2) The vehicle temperature control system according to (1),
- in which the second pump is configured such that a flow rate thereof is capable of being changed according to control of the control device, and
- in which in a case where the temperature of the first temperature control medium is lower than the predetermined value, the control device further sets the flow rate of the second pump to be smaller than a flow rate in a case where the temperature of the first temperature control medium is equal to or higher than the predetermined value.

When the carrier frequency is low, the amount of heat generated by the inverter decreases, and thus the temperature of the second temperature control medium hardly rises even if the flow rate of the second pump is reduced. According to (2), when the temperature of the first temperature control medium is lower than the predetermined value, the control device sets the flow rate of the second pump to be smaller than the flow rate when the temperature of the first temperature control medium is equal to or higher than the predetermined value, so that it is possible to reduce the energy required for driving the second pump while suppressing an increase in temperature of the second temperature control medium.

(3) The vehicle temperature control system according to (1) or (2),
- in which the vehicle further includes an internal combustion engine (internal combustion engine ICE),
- in which in a case where the temperature of the first temperature control medium is lower than the predetermined value and the internal combustion engine is being driven, the control device sets the carrier frequency to be lower and controls the flow rate control valve so that the flow rate to the second branch flow path is smaller, as compared with a case where the temperature of the first temperature control medium is lower than the predetermined value and the internal combustion engine is stopped.

According to (3), it is possible to facilitate temperature rise of the first temperature control medium using the heat of the rotary electric machine while suppressing deterioration of NV (Noise, Vibration) characteristics of the vehicle due to a driving sound of the rotary electric machine.

The invention claimed is:

1. A vehicle temperature control system, comprising:
a first temperature control circuit that is provided with a first pump and that is configured to perform temperature control of a rotary electric machine and a gearbox provided in a vehicle;
a second temperature control circuit that is provided with a second pump and that is configured to perform temperature control of an electric-power conversion unit provided in the vehicle;
a heat exchanger in which heat exchange between a first temperature control medium circulating through the first temperature control circuit and a second temperature control medium circulating through the second temperature control circuit is performed; and
a control device,
wherein the first temperature control circuit includes a first temperature sensor configured to detect a temperature of the first temperature control medium,
wherein the second temperature control circuit includes
  a radiator with which heat exchange between the second temperature control medium and outside air is performed,
  a first branch flow path of the second temperature control medium that bypasses the heat exchanger,
  a second branch flow path of the second temperature control medium that passes through the heat exchanger, and
  a flow rate control valve with which a flow rate of the second temperature control medium to the second branch flow path is controlled,
wherein the electric-power conversion unit includes an inverter configured to supply electric power to the rotary electric machine, and is capable of changing a carrier frequency of the inverter under control of the control device, and
wherein the control device is capable of controlling the carrier frequency and the flow rate control valve based on the temperature of the first temperature control medium detected by the first temperature sensor, and
wherein in a case where the temperature of the first temperature control medium is lower than a predetermined value, the control device is configured to set the carrier frequency to be lower and controls the flow rate control valve such that the flow rate to the second branch flow path is smaller, as compared with a case where the temperature of the first temperature control medium is equal to or higher than the predetermined value.

2. The vehicle temperature control system according to claim 1,
wherein the second pump is configured such that a flow rate thereof is capable of being changed according to control of the control device, and
wherein in a case where the temperature of the first temperature control medium is lower than the predetermined value, the control device further sets the flow rate of the second pump to be smaller than a flow rate in case where the temperature of the first temperature control medium is equal to or higher than the predetermined value.

3. The vehicle temperature control system according to claim 1,
wherein the vehicle further includes an internal combustion engine, and
wherein in a case where the temperature of the first temperature control medium is lower than the predetermined value and the internal combustion engine is being driven, the control device sets the carrier frequency to be lower and controls the flow rate control valve so that the flow rate to the second branch flow path is smaller, as compared with a case where the temperature of the first temperature control medium is lower than the predetermined value and the internal combustion engine is stopped.

* * * * *